Aug. 26, 1952  R. R. RICHARDSON ET AL  2,608,139
APPARATUS FOR SETTING UP PAPER RECEPTACLES
Filed Sept. 29, 1949  11 Sheets-Sheet 1

INVENTORS
Ralph R. Richardson
and
Don W. Coy
by: Soans, Pond + Anderson
Attys.

Aug. 26, 1952     R. R. RICHARDSON ET AL     2,608,139
APPARATUS FOR SETTING UP PAPER RECEPTACLES
Filed Sept. 29, 1949     11 Sheets-Sheet 6

INVENTOR.
Ralph R. Richardson
and
Don W. Coy
by Evans, Paul & Anderson
attys.

Aug. 26, 1952   R. R. RICHARDSON ET AL   2,608,139
APPARATUS FOR SETTING UP PAPER RECEPTACLES
Filed Sept. 29, 1949   11 Sheets-Sheet 7

INVENTORS
Ralph R. Richardson
and
Don W. Coy
by: Evans, Pond & Anderson
attys.

INVENTORS
Ralph R. Richardson
and
Don W. Coy
by: Evans, Pond & Anderson
attys.

INVENTOR.
Ralph R. Richardson
and
Don W. Coy

Aug. 26, 1952    R. R. RICHARDSON ET AL    2,608,139
APPARATUS FOR SETTING UP PAPER RECEPTACLES
Filed Sept. 29, 1949    11 Sheets-Sheet 10

INVENTORS
Ralph R. Richardson
and
Don W. Coy
by: Soans, Pond + Anderson
attys.

Aug. 26, 1952 — R. R. RICHARDSON ET AL — 2,608,139
APPARATUS FOR SETTING UP PAPER RECEPTACLES
Filed Sept. 29, 1949 — 11 Sheets-Sheet 11

INVENTORS
Ralph R. Richardson
and
Don W. Coy
by: Soans, Pond & Anderson
attys.

Patented Aug. 26, 1952

2,608,139

UNITED STATES PATENT OFFICE 2,608,139

APPARATUS FOR SETTING UP PAPER RECEPTACLES

Ralph R. Richardson and Don W. Coy, Chicago, Ill., assignors to Chicago Carton Company, Chicago, Ill., a corporation of Delaware Application September 29, 1949, Serial No. 118,515

13 Claims. (Cl. 93—49)

This invention relates to apparatus for setting up paper receptacles and, more particularly, to apparatus for forming a precut paper board blank into a tray-like receptacle in which locking ears formed in certain walls of the tray extend through slits provided in certain other walls thereof.

The main objects of the invention are to provide an efficient, rapid operating mechanism for forming a flat paper board blank into a receptacle; to provide means for automatically inserting locking tongues formed in certain walls of the receptacle through slits in other walls thereof; to provide such mechanism from which the formed trays are automatically ejected and to which the blanks to be formed into trays may be fed automatically or by hand, as preferred; to provide mechanism of the character indicated of small size and compact construction so that it will take up but a small amount of floor space, and to provide such mechanism which will operate quietly and which will require but little power for operation.

Other objects and advantages of the invention will be understood by reference to the following specification and accompanying drawings (11 sheets) in which there is illustrated apparatus of the character indicated embodying a selected form of the invention.

In the drawings,

Figs. 1 and 2 are side elevations of the opposite sides of the machine;

Figure 18:
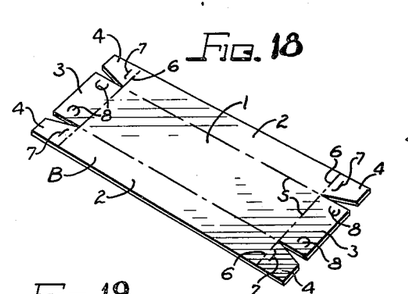
Figs. 18 to 25 are perspective illustrations representing successive stages of the box blank from its initial form as a precut, prescored and slitted blank, as shown in Fig. 18, to a completed, tongue and slit locked tray, as shown in Fig. 25.
Figure 25:
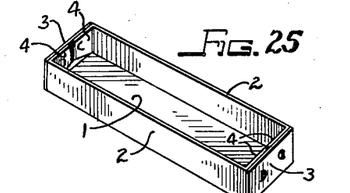

The apparatus shown in this application is designed for the formation of an elongated shallow tray-like box or receptacle as shown in Fig. 25. Such a receptacle is formed from a flat, prescored and preslitted blank B such as shown in Fig. 18, which includes a central bottom panel 1, side wall panels 2—2, end wall panel 3—3 and side wall end tongues 4—4. The side and end wall panels 2 and 3 are foldably connected to the bottom panel 1 along suitable fold lines 5 and the tongues 4 are similarly foldably connected to the ends of the respective side wall panels by suitable fold lines 6. The tongues 4 are each provided with a slit 7 for receiving an ear 8 of generally semi-circular form, such ear being provided by means of semi-circular slits through the end wall panels 3.

Figures 19, 20:
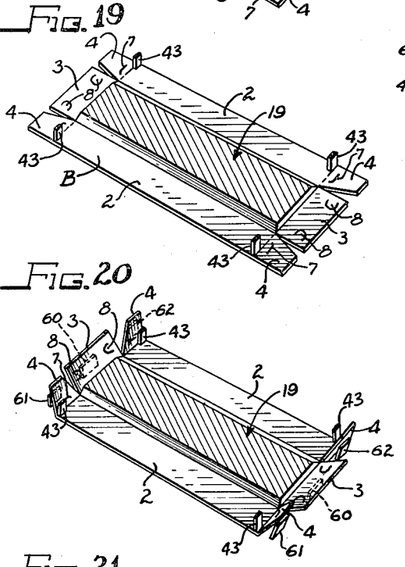
Figure 22:
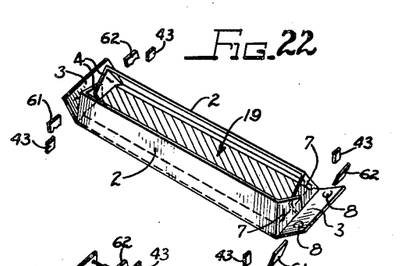

A blank, such as shown in Fig. 18, is formed into a receptacle by first folding the tongues 4 and end walls 3 to upwardly extending positions substantially as represented in Fig. 20, the ears 4 being folded to a more nearly perpendicular relationship to the side wall panels than are the end wall panels 3 to the bottom panel. Thereafter, the side wall panels 2 are folded upwardly and inwardly beyond perpendicular relation to the bottom panel substantially as illustrated in Fig. 22, the tongues 4 being thereby incidentally moved into partially overlapping relationship as indicated. To insure that the overlapping tongues will pass each other into the overlapped position shown in Fig. 22, the tongues 4 of one of the side walls, are initially folded to a more nearly perpendicular position than the other pair as illustrated in Fig. 20.

After the parts of the blank have been folded to the condition illustrated in Fig. 22, the end wall panels 3 are folded upwardly to perpendicular wall forming position and the ears 8 are then displaced inwardly from the respective end walls.

Figure 24:
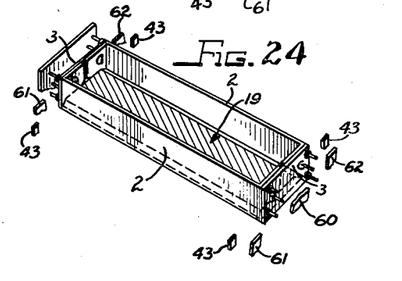

Incident to such inward displacement of the ears 8, portions of the tongues 4 immediately outside of the slits 7 in the tongues are also displaced inwardly, the slits being thereby opened and the ears 8 projected inwardly beyond the planes of the tongues 7 whereupon the side walls 2 together with their respective end tongues 7 are caused to return outwardly to perpendicular wall position, as shown in Figs. 24 and 25. As an incident to such outward movement of the side walls and their end tongues, the tongue portions inwardly of the slits 7 pass outwardly of the ears 8 to thereby, in effect, insert the ears 8 through the slits 7. In the finished box, as shown in Fig. 25, the free ends of the tongues 4 are disposed opposite each other in slightly spaced relation, the normal resiliency of the material serving to cause said tongues to tend to unfold outwardly into intimate face-to-face engagement with the respective end walls 3.

Figure 1:
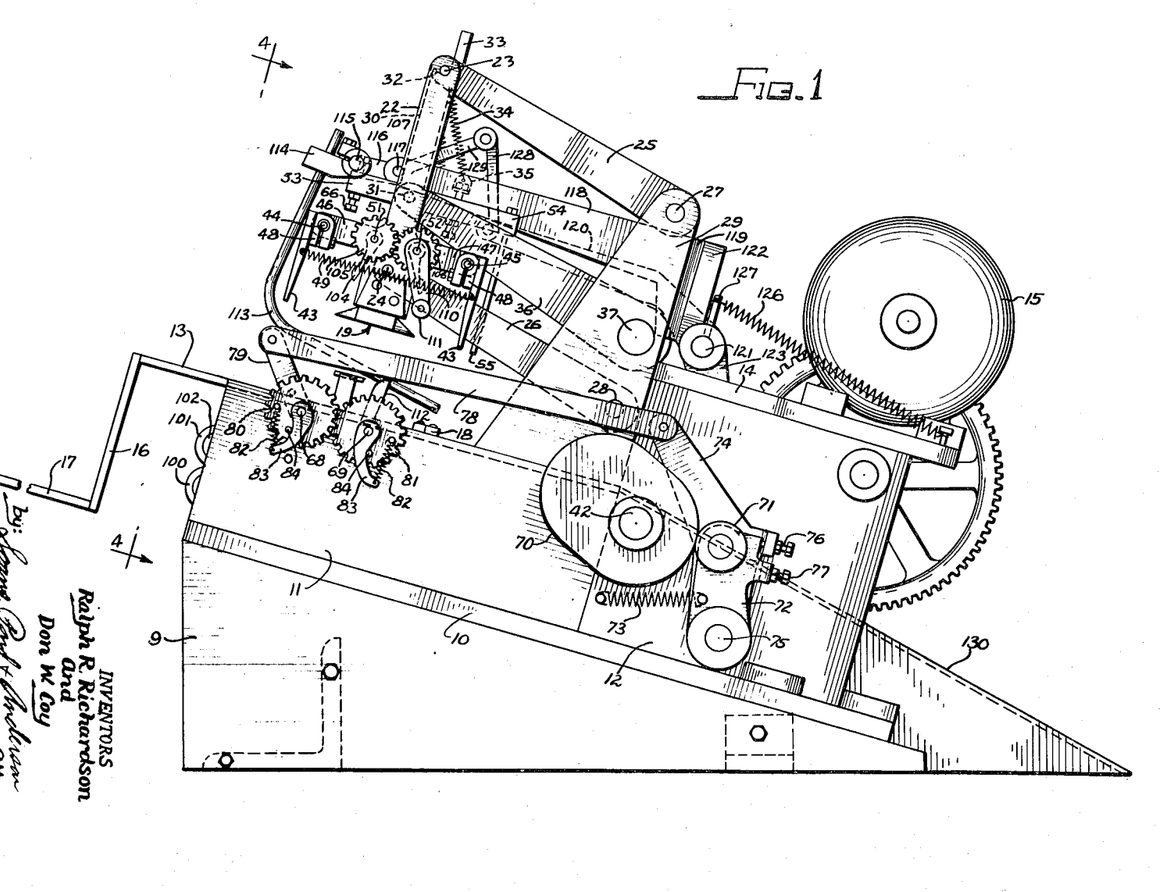

The apparatus herein shown for forming a receptacle such as and in the manner indicated in Figs. 18 to 25, comprises a base or frame structure 9 which may be mounted on any suitable bench or supporting frame, the upper edges or top 10 of said base 9 being disposed at an angle to the horizontal as indicated in Fig. 1. On the top plate 10 of the supporting structure there are mounted upwardly extending front and rear side plates 11, 11 and 12, 12 respectively (see Figs. 1–4 inclusive). The side plates 11 have their upper edges interconnected by means of a table plate 13 and the upper edges of the side plates 12 are interconnected by a top plate 14. The top plate 14 supports a suitable electric motor 15 which drives the mechanism and the table plate 13 provides the working surface on which the flat blank of Fig. 18 is placed for folding by the apparatus. The table plate 13 is extended forwardly, as shown in the drawings, and provided with a downwardly extending wall 16 which supports a shelf 17 which, in turn, may support a supply stack of blanks of the form shown in Fig. 18. With the supply supporting shelf 17 the structure is designed for hand feeding, such as is employed where volume of receptacles to be formed is small. In instances where larger volume requirements justify it, automatic blank feeding mechanism (not shown) may be provided.

Figure 5:
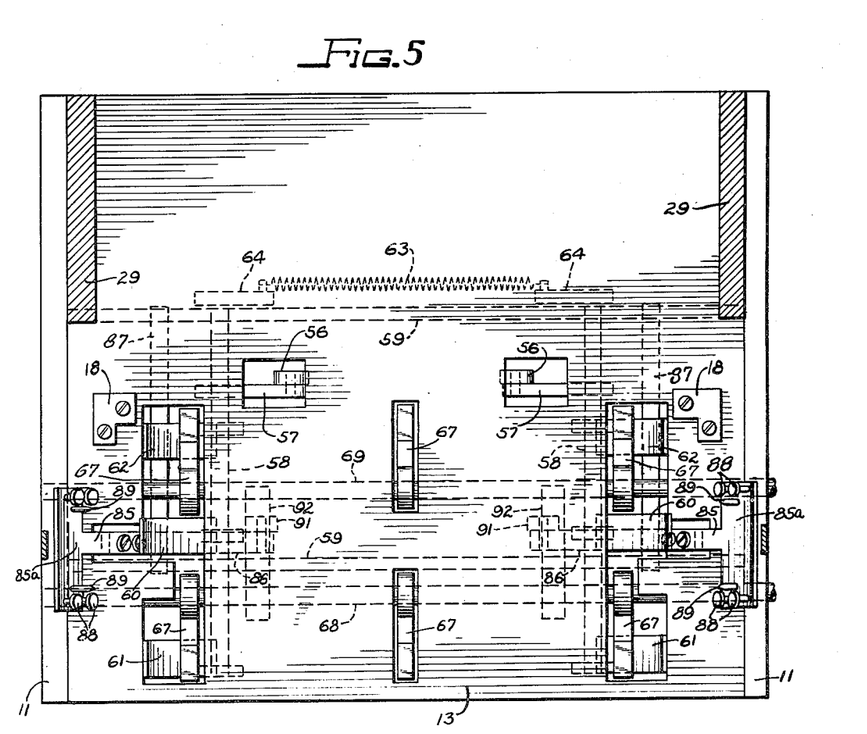
Fig. 5 is a plan section on the line 5—5 of Fig. 4.

Blanks are positioned on the table plate 13 by means of suitable corner stops 18 (see Figs. 5 and 6) which are adapted to receive one pair of corner portions of the flat blank.

A presser foot or mandrel 19 is provided for engaging the bottom panel 1 of the blank and pressing it firmly against the table plate 13. The mandrel 19 is of a maximum length and width corresponding to the length and width of the bottom panel 1 and to permit the side and end walls of the receptacle to be over-folded as already explained, the side and end edges of the receptacles are beveled, the sides 20 being beveled to a substantially inclined relationship to the plane of the bottom face of the mandrel, while the end edges 21 of the mandrel are beveled to a lesser degree as will be understood from an inspection and comparison of Figs. 6 and 9.

The mandrel 19 is a rigid plate which is fixedly attached to the lower ends of a pair of upwardly extending arms 22, 22. These arms 22 (see Figs. 3 and 4) are interconnected by upper and lower cross shafts 23 and 24 respectively. This frame-like structure comprising the arms 22 and cross rods or shafts 23 and 24, is supported for up and down movement by means of an upper pair of links or rock arms 25 (see Figs. 12 and 2) and a lower pair of links or rock arms 26 which have their front ends journaled on the rods 23 and 24, and their rear ends pivoted on upper and lower cross shafts 27 and 28 respectively. These cross shafts are supported in upstanding brackets 29 which are mounted on the table plate 13 adjacent the rear side wall portions 12, 12. The arms 22, rigidly connected by the cross rods 23 and 24 are movable in an up and down direction relative to the table plate 13 in a slightly arcuate path about the axes of the pivot shafts 27 and 28 and the mandrel 19 on the lower ends of said arms 22 is similarly movable to and from the table plate 13 in a slightly arcuate path of travel. Movement of these parts is controlled by a rotary cam driven by the motor 15.

Figure 3:
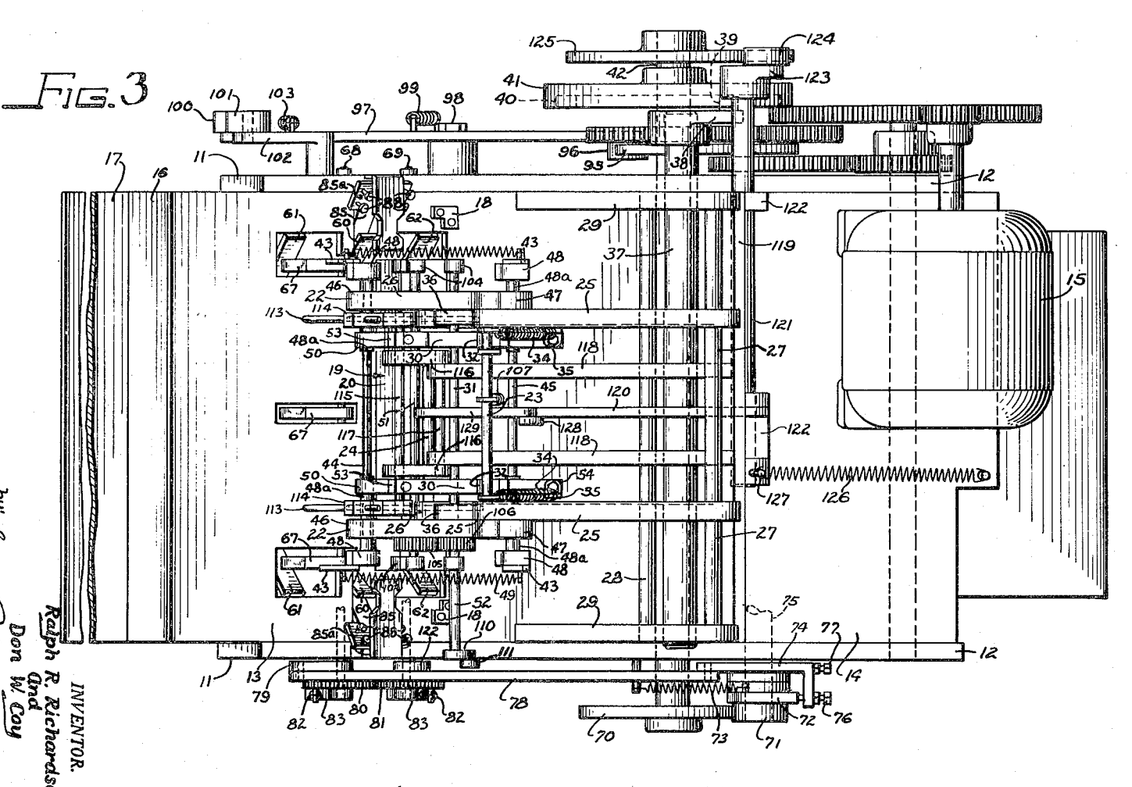
Fig. 3 is a top view.
Figure 4:
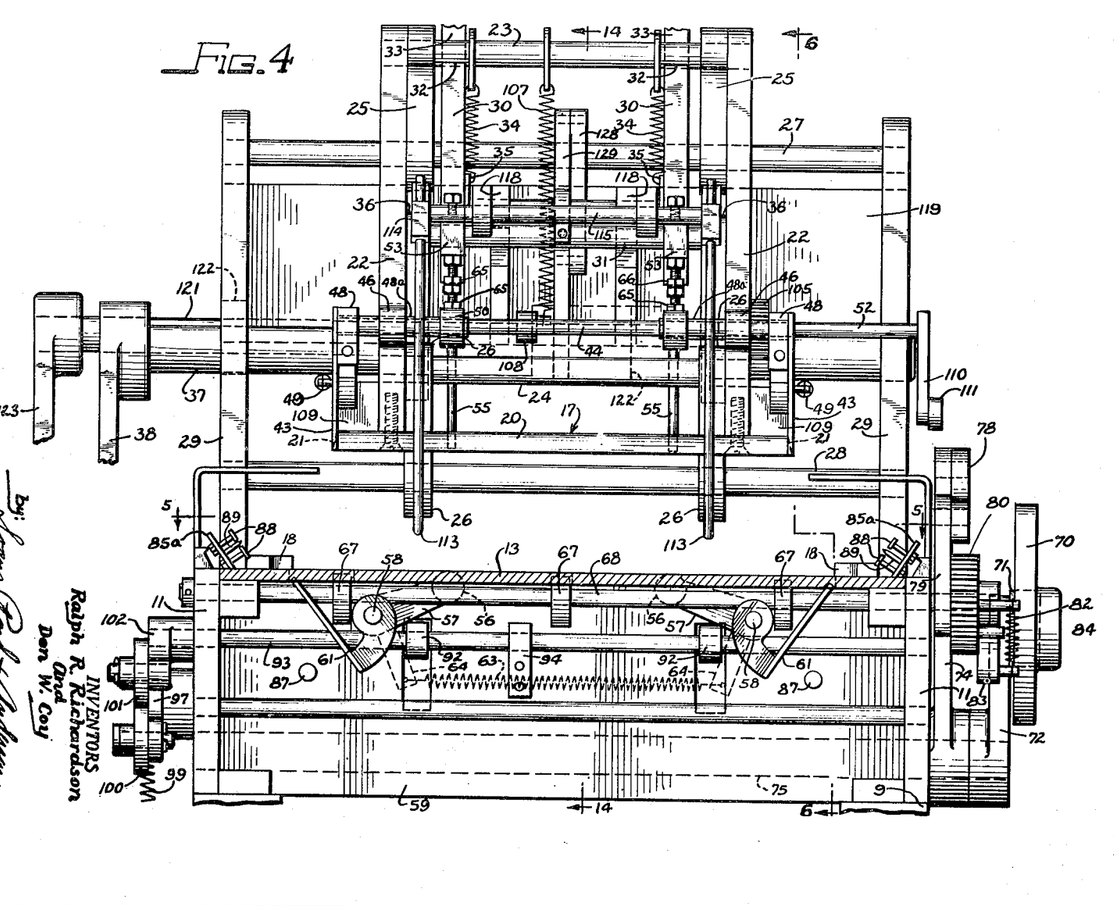
Fig. 4 is essentially a front elevation on the plane indicated by the line 4—4 of Figs. 1 and 2.

There are provided a pair of inner arms 30 which parallel the arms 22, the arms 30 being disposed inwardly of said arms 22 and inwardly of the links 25 and 26 (see Figs. 3 and 4).

The arms 30 are rigidly interconnected by means of a cross shaft 31 and the upper ends of said arms 30 are provided with recessed seats 32 (see Figs. 4 and 6) which are adapted to be seated against the rear face of the rod 23. Coil springs, such as indicated at 34, stretched between the upper cross rod 23 and an anchor 35 secured to a part of each arm 30, serve to normally yieldingly maintain the upper end of each arm 30 seated against the upper cross rod 23 in the position illustrated. (See also Fig. 14.)

Figure 2:
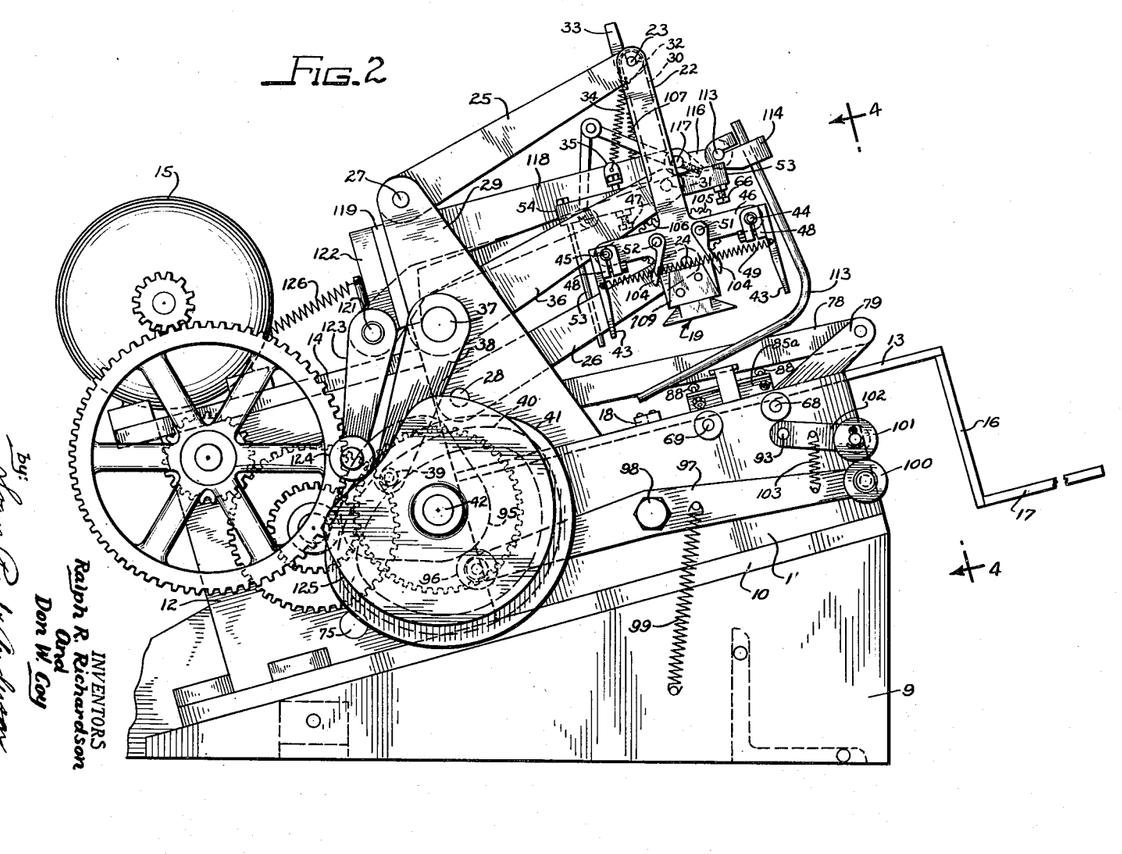
Figures 9, 10, 11:
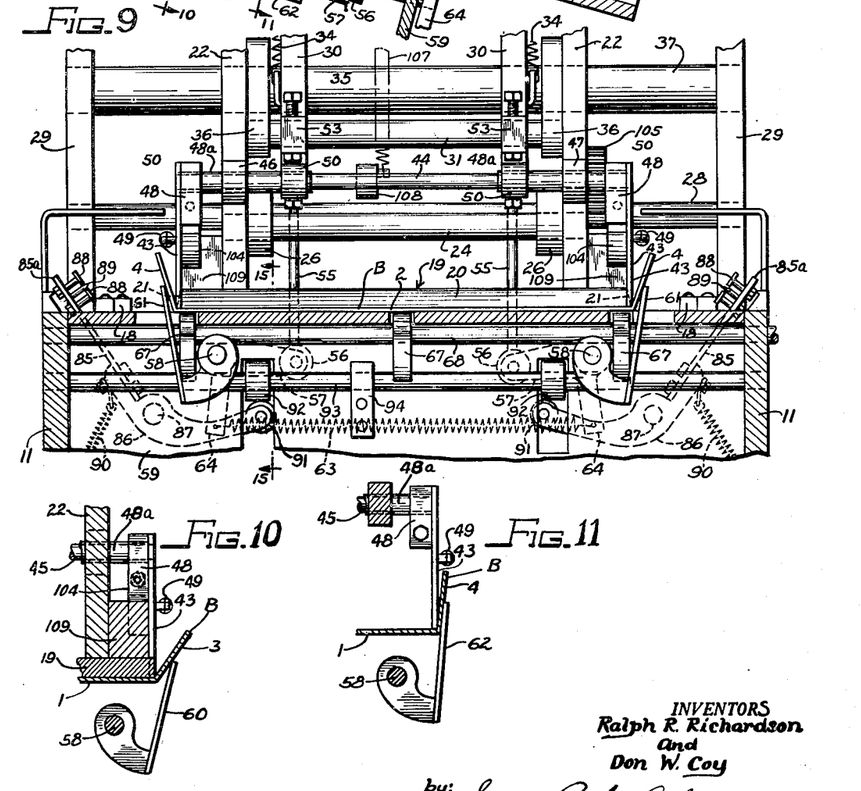
Fig. 9 is a section on the line 9—9 of Fig. 8.
Figs. 10 and 11 are detail sections on the lines 10, 10 and 11, 11 respectively of Fig. 8.
Figure 14:
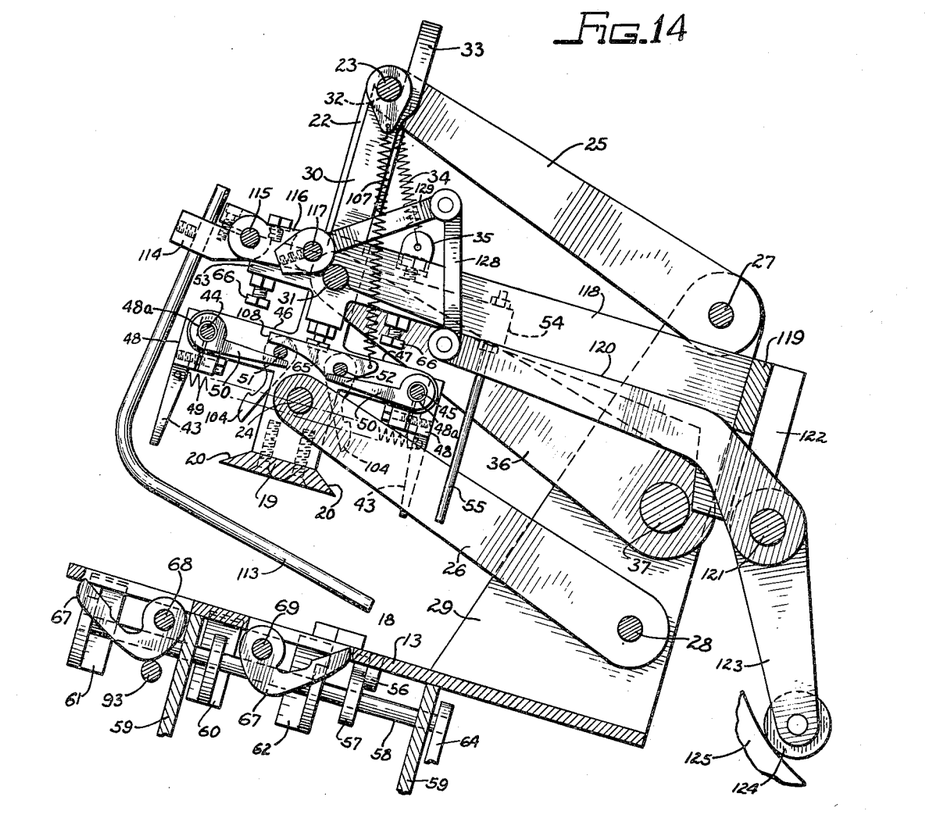
Fig. 14 is a section on the line 14, 14 of Fig. 4.

A pair of arms or links 36 have their front ends journaled on the cross shaft 31 outside of the arms 30 and in the planes of the upper and lower arms 25 and 26 (see Figs. 4, 9 and 14). The rear ends of the arms 36 are rigidly secured to a cross shaft 37 which is journaled in the brackets 29, one end of said shaft 37 being extended beyond the adjacent bracket 29 and beyond the adjacent side of the mechanism and provided with a lever arm 38 (Figs. 2 and 3). The free end of the level arm 38 is provided with a roller 39 which is received within a trackway 40 of a rotary cam disc 41 which is carried by a shaft 42 that is journaled in the rear side plates 12.

The shaft 42 is driven continuously by the electric motor 15 through the agency of a train of gears, as best shown in Figs. 2 and 3, which serves to reduce the relatively high speed of rotation of the motor shaft to the required slower speed of rotation of the shaft 42. The various gears of the gear train are, of course, suitably mounted for rotation in mesh with one another to provide the required operating relationship.

The cam track 40 is so shaped as to impart the desired rocking motion to the cross shaft 37 and the desired up and down movement to the arms 30 and 22 which are normally yieldingly held in the relationship shown in Fig. 14 as already explained. The cam track 40 is, of course, so formed as to maintain the parts actuated thereby at rest during the operation of certain instrumentalities, the mandrel 19 being maintained at rest in its lowered box blank holding position, as shown in Fig. 7, for a considerable portion of each cycle of operation.

Figures 6, 7:
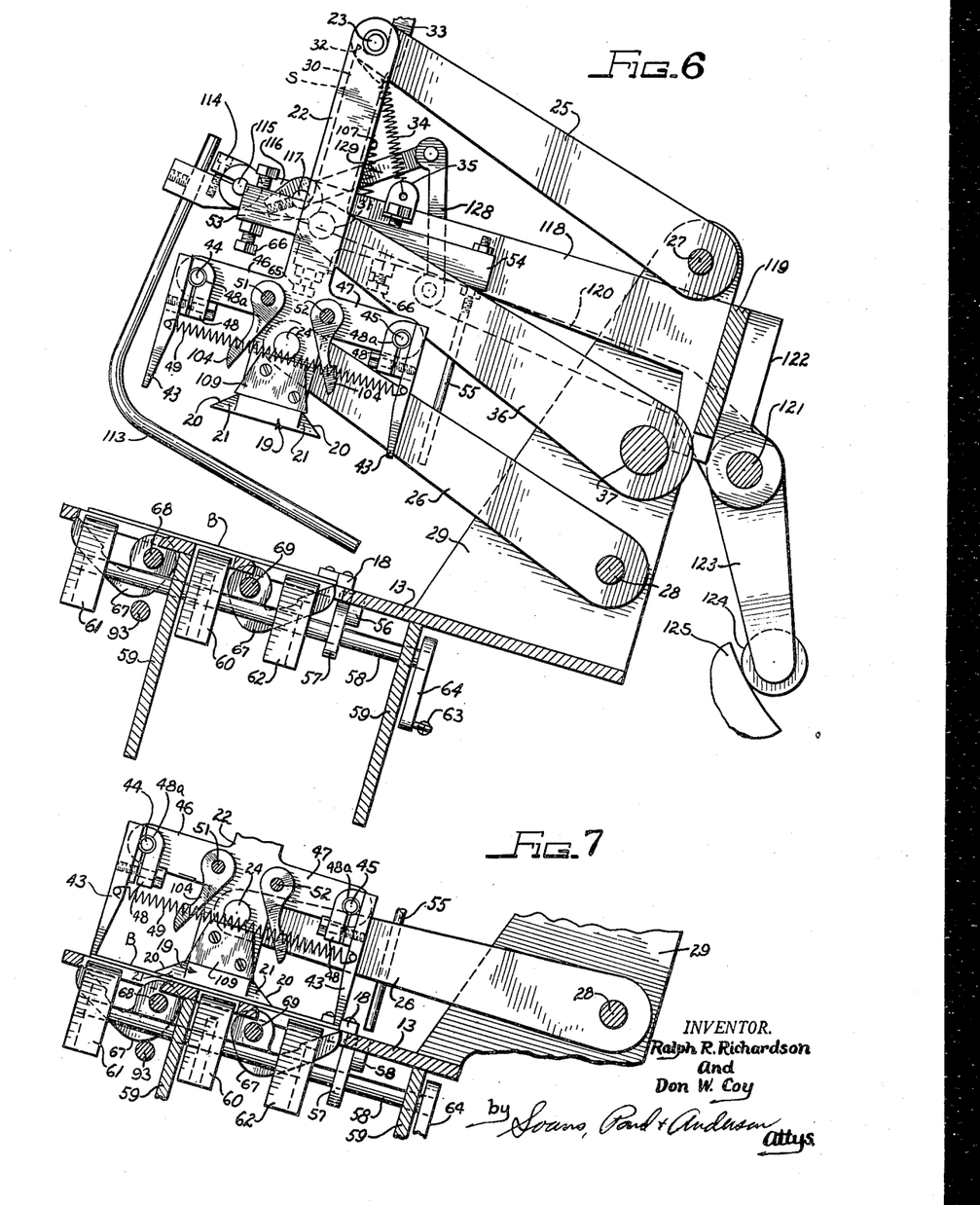
Fig. 6 is a vertical section on the line 6—6 of Fig. 4.
Figs. 7 and 8 are sections corresponding to portions of Fig. 6 but showing successively changed positions of certain parts of the mechanism.

A blank B being first positioned by the gauge blocks 18 on the table plate 13, the presser foot or mandrel 19 is lowered from the starting position shown in Fig. 6, to the blank holding position shown in Fig. 7. For purposes which will presently appear, four side wall corner holding fingers 43 are provided, one pair of said fingers being supported by a front cross shaft 44 and the other pair being supported by a rear cross shaft 45. These cross shafts 44 and 45 are supported in laterally extending ears or projections 46 and 47 formed integrally with the arms 22. The hold-down fingers 43 are independently rotatably adjustably mounted on the shafts 44 and 45 respectively, through the agency of clamping blocks 48 and sleeves 48a so that the fingers may be adjusted to the desired positions on the shafts 44 and 45. The fingers 43 are rigidly secured to the mounting blocks 48 and the latter are clamped on the sleeves 48a which are rotatable on the shafts 44 and 45 and in bearing openings in the arm projections 46 and 47.

Coil springs 49 (see Figs. 1, 2 and 9) tensioned between the pairs of fingers 43 at opposite ends of the shafts 44 and 45 serve to normally and yieldingly maintain the fingers 43 in the box blank engaging positions in which they are illustrated in Figs. 6 and 7.

For limiting the extent to which the springs 49 may rock the fingers 43 inwardly, each sleeve 48a is provided with an arm or lever 50 (Fig. 14) which projects inwardly into underlying relation to another pair of cross shafts 51 and 52 which are journaled in the arms 22 or their lateral extensions 46 and 47. As shown in Fig. 14, the arms or fingers 50 engage the shafts 51 and 52 and thereby limit inward rocking of the hold-down fingers 43 while at the same time permitting outward rocking thereof when required. By rotational adjustment of the fingers 43 or the levers 50 about the sleeves 48a, accurate predetermined positioning of the fingers 43 may be attained.

When the presser foot 19 comes into engagement with the bottom panel 1 of the box blank, the fingers 43 come into engagement with marginal portions of the side wall panels 2 of the box blank adjacent the ends thereof as will be readily understood from an inspection of Figs. 7 and 19.

When the mandrel 19 and the hold-down fingers 43 are in the operative blank holding position shown in Fig. 7, downward movement of the arms 22 and parts carried thereby is terminated. This, however, does not prevent the inner arm pair 30 from continuing to move downwardly since the latter arms are only yieldingly held in their initial position relative to the outer arm pair 22 by the coil springs 34 as previously explained.

The cam track 40 is so formed as to continue the rocking movement of the arms 36 beyond the rocking movement indulged in by the arms 25 and 36 so that the inner arm pair 30 and parts carried thereby also continue to move downwardly after the mandrel 19 and fingers 43 come to their stopping position as shown in Fig. 7. The inner arms 30 are provided with forwardly and rearwardly extending lateral projections 53 and 54 (Fig. 6) and the rear projections 54 carry downwardly extending tappet rods 55. As an incident to continued downward movement of the inner arm pair 30 said tappet rods 55 move downwardly and their lower ends engage rollers 56 carried on the free ends of rock arms 57 which are mounted on shafts 58 suitably journaled in cross plates 59 of the supporting frame structure (see also Figs. 5 and 9).

The rock shafts 58 each carry a folder 60 rigid with the rock shaft and in position to engage the then overlying end wall flap 3 of the carton blank, and tongue folders 61 and 62 which are adapted to engage the respective overlying tongues 4 (Figs. 5 to 11). Incident to continued downward movement of the tappet rod 55, the shafts 58 will be rocked so as to cause the folders 60, 61 and 62 to rock upwardly in such a manner as to engage and fold the end wall panels 3 and the tongues 4 upwardly as indicated in Figs. 9, 10 and 11. The folders 60, 61 and 62 are set at slightly different angles so that when the rocking movement of the shafts 58 is completed, the folders 62 will have folded their tongues 4 somewhat beyond the plane to which the folders 61 have folded their tongues 4 while the folders 60 will have folded the end wall panels 3 to a still lesser extent as represented in said Figs. 9, 10 and 11, and in Fig. 20.

The cam track 40 is so formed as to hold the inner arms 30 and the tappet rods 55 in their extreme down position for a short rest period during which other folding operations are performed. When the inner arms 30 and the tappet rods 55 are retracted, the folders 60, 61 and 62 are restored to their initial positions as represented in Figs. 6 and 7 by means of a coil spring 63 tensioned between arms 64 which are secured to and depend from the rock shafts 58 (see Figs. 6 and 9).

Figure 16:
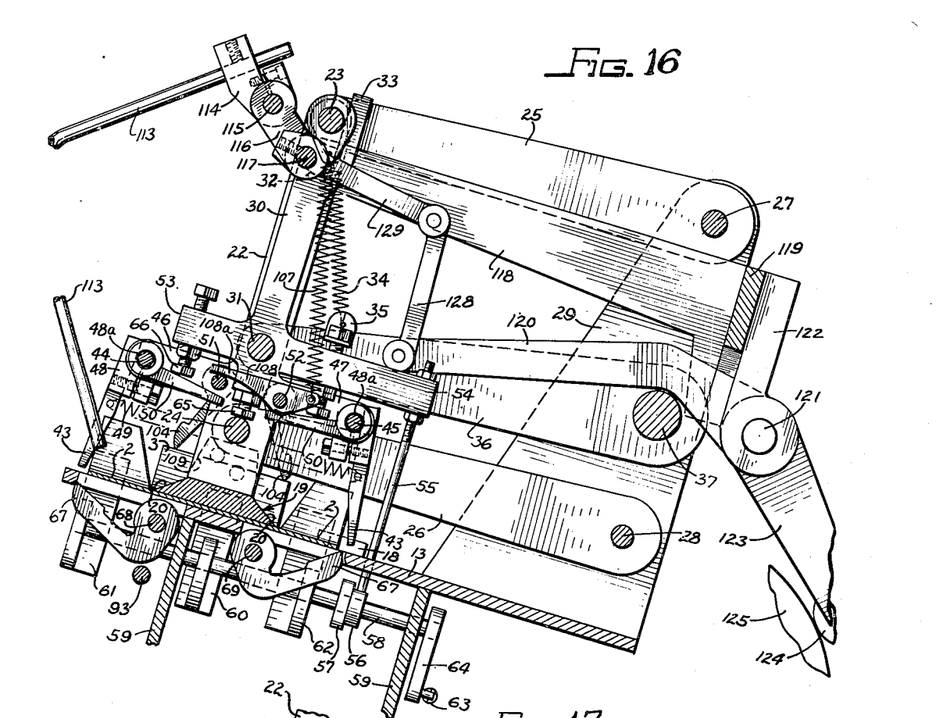
Figs. 16 and 17 are views corresponding in part to Fig. 14 but showing the parts in successively changed positions.

From an inspection of Fig. 16, it will be seen that when the inner arm pair 30 is moved downwardly relative to the outer arm pair 22, the springs 34 will be stretched while the extensions 33 on the upper ends of the arms 30 slide against the upper cross rod 23. Due to the angular disposition of the springs 34, as shown in Fig. 16, the arm extensions 33 are yieldingly held against the cross shaft 23 and there is no significant tendency for said arm extensions 33 to separate from said shaft 23. The bottom seat 32 together with the arm extension 33 constitutes a partial fork which, in the initial position of the parts represented in Fig. 14, embraces the shaft 23 to hold the parts in operative relationship. The employment of this partial fork instead of a full fork facilitates assembly of the structure in that the unit comprising the two inner arms 30 and the cross shaft 31 may be moved in a sidewise manner into place between the outer arm pair 22 and their connecting shafts 23 and 24.

Stop screws 65 threaded into the lower end portions of the inner arm pair 30 and adjustable as to the extent to which they project from said arms, are engageable with the cross shaft 24 to limit downward movement of the inner arm pair 30, as indicated in Fig. 16. These stop screws 65 constitute a means for preventing overthrow of the arms 30 and excessive rotation of the cross shafts 58 and folders carried thereby.

Figure 17:
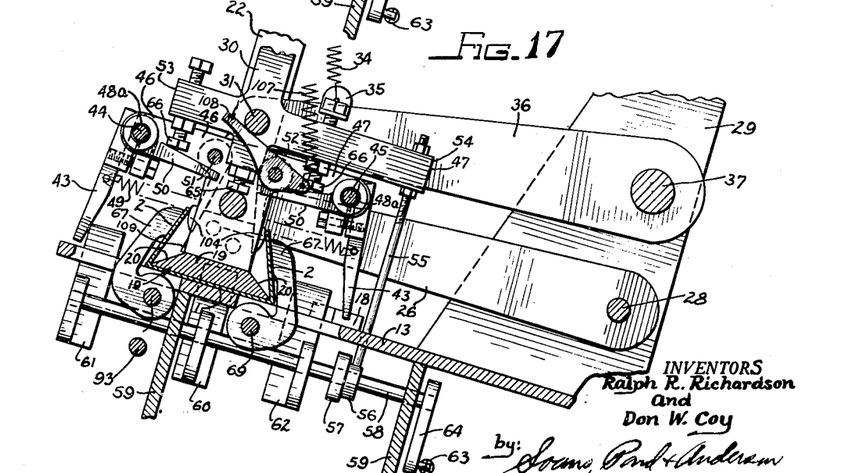
Figure 21:
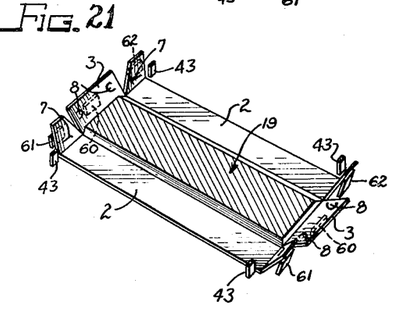

During the terminal portion of the downward movement of the inner arm pair 30 and tappet rod 55, that is to say, during the terminal portion of the folding movement of the folders 60, 61 and 62, the fingers 43 are swung outwardly to free the side wall panel portions of the blank for upward folding thereof which is to follow. The means for effecting such outward displacement of the fingers 43 is best shown in Figs. 14, 16 and 17. As there shown, the lateral extensions 46 and 47 of the inner arm pair 30 are provided with downwardly extending tappets 66 which, during the terminal portion of the downward movement of the arm pair 30, are engageable with the levers 50 to rock the same downwardly from the position shown in Fig. 14 to the position shown in Figs. 16 and 17. Such downward rocking of the levers 50 is, of course, transmitted through the sleeves 48a to the respective fingers 43 so that the latter are rocked outwardly as aforesaid. During the time interval in which the inner arm pair 30 remain downwardly as already explained, the fingers 43 are held in their outwardly offset positions as represented in Figs. 16, 17 and also in Fig. 21, whereby the side wall panels 22 of the receptacle blank are freed for upward folding.

Upward folding of the side wall panels 2 is effected by means of sets of folders 67 associated with the opposite side panels of the blank, one set of such folders being carried by a rock shaft 68 and the other set by a rock shaft 69. The rock shafts 68 and 69 and the respective folders 67 are normally located below the table plate 13, and the folders 67 are movable upwardly through suitable openings provided in the plate for that purpose as shown. The shafts 68 and 69 are journaled for rotation in the supporting frame sides 11 (see Fig. 9).

The shafts 68 and 69 are simultaneously rotated in opposite directions as required, to effect rocking of the opposite sets of folders 67 upwardly and toward each other for correspondingly folding the said side walls 2. The mechanism for so rocking the said shafts 68 and 69 is best shown in Figs. 1, 3 and 4. Said mechanism comprises a cam 70 secured to the end portion of the continuously driven cam shaft 42. Said cam acts against the roller 71 carried by an arm 72 which is biased toward the cam by suitable spring means, such as indicated at 73.

Another arm 74 is pivotally mounted on a frame supported shaft 75 on which the arm 72 is fixedly mounted, and said arm 74 is adjustably connected to the arm 72 by means of a set screw 76 carried by a portion of the arm 74 and engageable with a portion of the arm 72 and another set screw 77 carried by a portion of the arm 72 and engageable with a portion of the arm 74.

Figure 8:
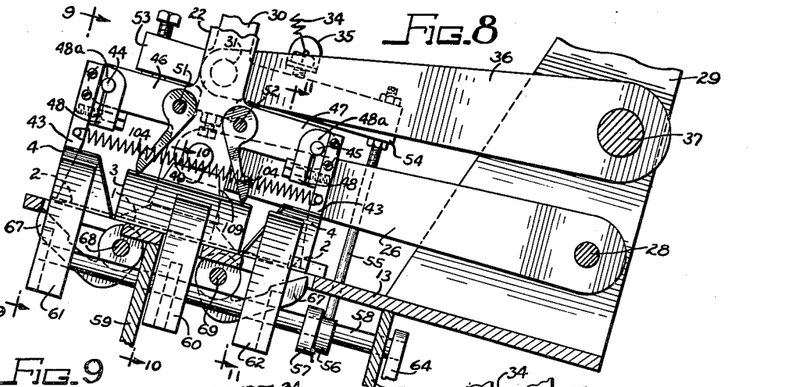

The free end of the arm 74 is connected by means of a link 78 to an arm 79 which is secured to a gear wheel 80 rotatably mounted on the shaft 68. The gear 80 meshes with a similar gear 81 which is rotatably mounted on the shaft 69. Each gear 80 and 81 is connected by a coil spring 82 to an arm 83 which is fixedly mounted on the shaft on which the gear is mounted so that rotation of the gears in opposite directions is transmitted through the respective springs and arms to the respective shafts 68 and 69. When the arm 79 is rocked in a clockwise direction from the position shown in Fig. 1, the shaft 68 will be simultaneously rocked in a clockwise direction while the shaft 69 will be rocked to a corresponding extent in a counter-clockwise direction. The folder sets 67 being carried by said shafts 68 and 69 will be correspondingly rocked to effect upward and inward folding of the side wall panels from their initial positions, as shown in Figs. 2 and 8, to their over-folded positions, as shown in Figs. 12 and 22.

Again referring to Fig. 1, when the cam 70 and spring 73 effect counter-clockwise rocking of the arm 79, pins 84 carried by the respective gears 80 and 81 engage the arms 83 to rock the shaft 68 in counter-clockwise direction and the shaft 69 in a clockwise direction to thereby restore the folders 67 to their starting positions.

It will be observed that folding movement is imparted to the folders 67 through the agency of the yieldable springs 82 so that when the folders 67 reach their limit of inward movement, the springs 82 may yield so that no fine adjustment is required in respect of the extent of rotation imparted to the gears 80 and 81. However, by appropriate adjustment of the set screws 76 and 77 it is possible to adjust the starting positions of the folders. In the event that improper box positioning or the presence of some foreign object should occur in the zone of the folders 67, the springs 82 will yield so as to avoid the application of excessive force to the folders 67, thereby avoiding injury or breakage in the mechanism. Simultaneously, return movement of the folders is yieldingly effected by the spring 73 so that in the event that normal return movement of the folders is desired, said spring 73 may yield so as to prevent the application of injurious forces to the mechanism.

Figure 12:
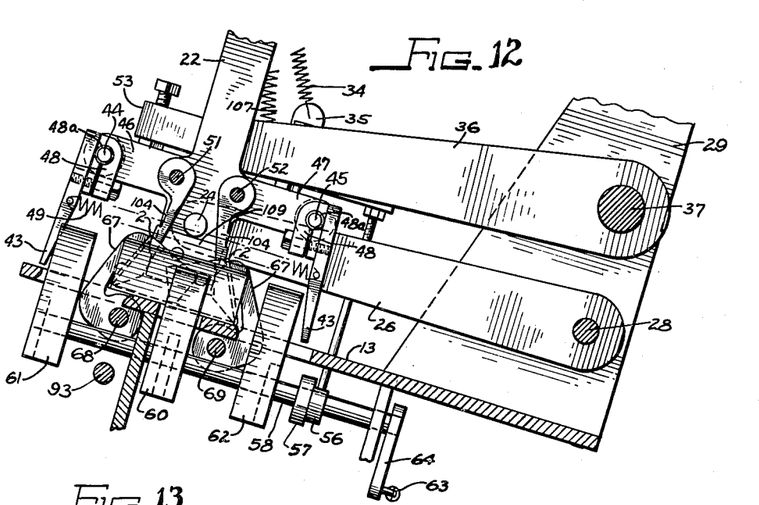
Fig. 12 is a section corresponding to a portion of Fig. 6 and to Figs. 7 and 8, but showing a still further changed position of certain parts.

As an incident to the overfolding of the side wall panels 2 to the position shown in Figs. 12, 17 and 22, the previously folded tongues 4 at the opposite ends of the respective side walls 2 will also be folded into mutually overlying relationship to each other and to the partially folded end wall panels 3, as represented in Fig. 22.

The completion of the folding of the end wall panels 3 is next effected. This is accomplished by means of end wall panel folders 85, 85 which are carried by rock arms 86, 86 journaled on pivot pins 87 carried by the frame members 59 (see Figs. 5, 9 and 13). The folders 85 are of generally T-shaped form having enlarged head portions 85a which are provided at their opposite ends with pairs of flat faced pressure pins 88 and relatively small or pointed pressure pins 89.

Figure 13:
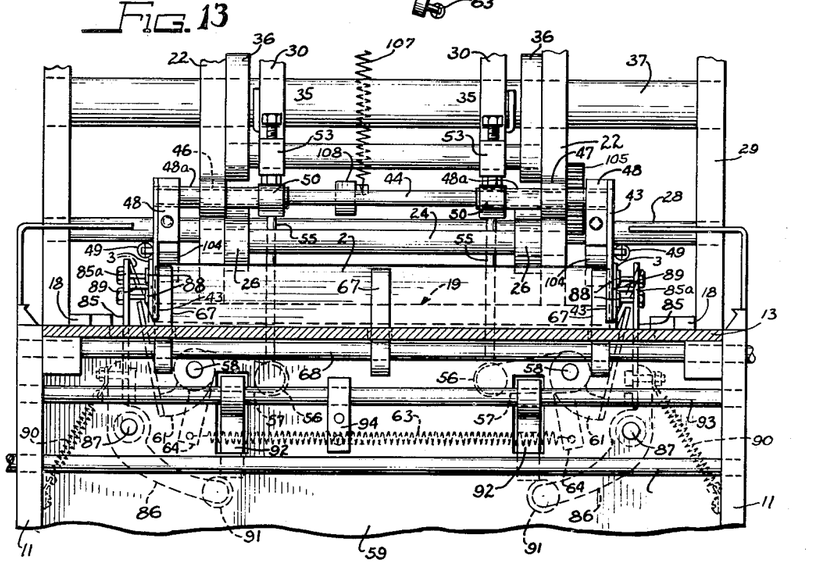
Fig. 13 is a section corresponding to Fig. 9, but showing certain parts in a changed position which corresponds to the position of the parts as shown in Fig. 12.
Figure 23:
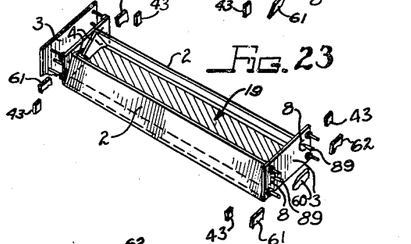
Figure 26:
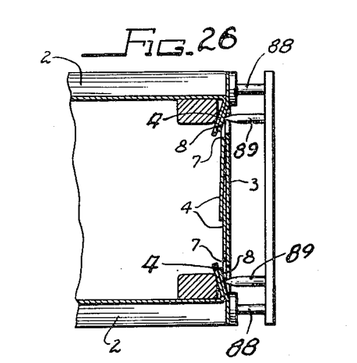
Fig. 26 is a plan section further illustrating the position of certain parts shown also in Figs. 13 and 23.

The end panel folders 85 are rocked upwardly and inwardly of the box blank so as to cause the pressure pins 88 to engage the respective end wall panels near their ends and near their top and bottom edges to thereby effect folding of said end wall panels from their initially partially folded position shown in Fig. 22, to their substantially vertical wall forming position shown in Figs. 13, 23 and 26. The smaller pressure pins 89 are so positioned that they will engage the ears 8 in the end wall panels so as to offset the same inwardly from the plane of the respective end wall panels as can be understood from an inspection of Figs. 23 and 26.

Figure 27:
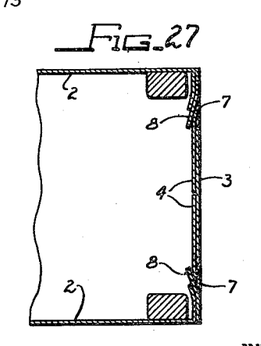
Fig. 27 is a plan section corresponding to Fig. 26 but showing the parts in another position.

The ears 8 are so related to the slits 7 in the tongues 4 that when said ears 8 are offset inwardly in the manner just explained, their free ends will press against portions of the respective tongues immediately outside of the slits 7 so as to also offset the engaged tongue portions to thereby, in effect, open the slits 7. Hence, when the side walls 2 and tongues are, in effect, unfolded from their over-folded positions as shown in Figs. 23 and 26, to their normal box positions as shown in Figs. 24 and 27, the ears 8 will pass through said slits to lock said end walls 3; 3 in wall position, and also to limit the unfolding of said side walls 2, or in other words, lock said side walls in set-up position. The mechanism for effecting such unfolding of the over-folded side wall panels and tongues will presently be explained.

Figure 15:
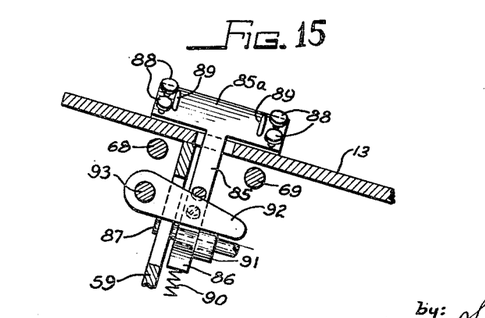
Fig. 15 is a detail section on the line 15, 15 of Fig. 9.

The end wall folders 85 are yieldingly held in their outer or initial positions as shown in Fig. 9, by suitable spring means indicated at 90, tensioned between portions of the respective rock arms 86 and the adjacent side members 11 of the supporting frame structure (see Fig. 13). The rock arms 86 are provided at their inner ends with rollers 91 which are engaged by the free ends of arms or levers 92, 92 (see Figs. 13 and 15) which are secured to a shaft 93 extending from side to side of the machine and journaled in the side members 11 and in a suitable bearing support 94 carried by the front frame member 59. When the shaft 93 is rocked, the levers 92 will engage the rollers 91 and thereby effect rocking of the respective rock arms 86 and end folding members 85.

Mechanism for effecting rocking of the shaft 93 is shown in Fig. 2 and comprises a cam 95 carried by the cam shaft 42 and acting against a roller 96 carried by one end of a lever 97 which is pivoted intermediate its ends, as indicated at 98, on the adjacent side frame member 11. A spring 99 serves to bias the lever 97 in such a direction that the cam following roller 96 is maintained in engagement with its operating cam 95.

The other end of the lever 97 is provided with a roller 100 which engages a roller 101 carried by an arm 102 which is secured to the adjacent end portion of the said shaft 93. A coil spring 103 is tensioned between the arm 102 and adjacent portion of the lever 97 so as to normally maintain the rolls 100 and 101 in engagement. The cam 95 is operative to effect rocking of the shaft 93 in the direction required to effect folding movement of the end folders 85, 85 and the spring 99 serves to retract the folders when permitted to do so by the formation of the cam 95. The spring 103 serves, of course, to transmit retracting movement of the lever 97 to the arm 102, shaft 93, and folders 85, 85.

As already indicated, after the end wall panels 3 are folded to their final fully folded positions, the side wall panels 2 and their respective end flaps 4 are returned from their over-folded positions as shown in Figs. 22 and 23, to their normal box positions as shown in Figs. 24 and 27. For effecting such return movement there are provided unfolding arms 104, 104 (Figs. 16 and 17) carried by the shafts 51 and 52 and located at the ends of said side walls. (See also Fig. 9.)

The shafts 51 and 52 are, as already explained, journaled in the lateral extensions 46 and 47 of the arms 22 and they are geared together at one end so as to simultaneously rotate in opposite directions.

By reference to Figs. 1 and 4, it will be seen that the shaft 51 is provided with a gear 105 which meshes with a similar gear 106 on the shaft 52 so that these shafts are maintained in a fixed relationship to each other. The unfolding arms or fingers 104 are respectively fixed to said shafts 51 and 52, and spring means is provided for normally urging the shafts to rock in such a direction as to cause the lower ends of said arms 104 to swing outwardly or away from each other. This spring means consists of a coil spring 107 (Figs. 4 and 16) which is anchored at its upper end to an ear carried by the cross shaft 23, and at its lower end to a pin projecting from a small arm or lever 108 which is pinned or otherwise anchored in fixed position on the shaft 52. The arm 108 has an extension or tail 108a, which extends into overlying relation to the shaft 51 whereby rocking of the shaft 52 by the force of the spring 107 is limited to an incident to engagement of said arm extension 108a with the shaft 51.

As shown in Fig. 16, the unfolding arms 104 are in their initial or starting positions. They are yieldingly held in this position by the spring 107, arm 108, and the interconnecting gears 105 and 106. When the side wall panel portions 2 are folded from their initial flat position, as shown in Fig. 16, to their over-folded positions, as shown in Fig. 17, the end portions of these wall panels come into engagement with the outwardly convex lower end portions of the arms 104 and rock the same inwardly from the position shown in Fig. 16 to the position shown in Fig. 17. The spring 107 yields readily under the force of the folders 67 and the arm 108 rocks upwardly from the position shown in Fig. 16 to that shown in Fig. 17.

The extent to which the side wall panels 2, 2 are over-folded is limited by engagement of the unfolding fingers 104 with the oppositely inclined edge faces of stop members 109 which extend upwardly from the mandrel or platen 19 at its opposite ends. Stopping of the folding movement of the folder 67 in this manner is, of course, permitted by the yielding transmission of force from the rocking arms 83, 83 (Fig. 1) to the shafts 68 and 69 through the springs 82, 82 as already explained. This yielding force transmission avoids any requirement of actuating mechanism made with a high degree of accuracy to transmit exact predetermined movement to the folder arms.

After the end wall panels 4, 4 have been folded to their wall positions, as shown in Fig. 13, the cam 70 (Fig. 1) permits the spring 73 to effect reverse movement of the mechanism which rocks the folders shafts 68 and 69, this unfolding movement being positively transmitted from the gears 80 and 81 to the arms 83, 83 through the pins 84 carried by said gears. As the folders 67 swing outwardly from the position shown in Fig. 17, the spring 107 acts to cause the unfolding fingers 104 to move outwardly to thereby effect unfolding of said wall panels 2 to their proper vertical positions relative to the bottom panel. The outer or expanded positions of the unfolded arms 104 are such that the outer faces of the lower end portions of said arms will just fit within the set-up receptacle.

To insure unfolding movement of the arms 104, the shaft 52 is provided at one end with an arm 110 (Figs. 1, 3 and 4) which is provided at its lower end with a roller 111 for engagement by an arm 112 which is secured to the folder arm shaft 69. The arm 112 is so positioned on the shaft 69 that during the opening movement of the folders 67 said arm will engage the roller 111 to correspondingly rock the arm 110 and shaft 52 in the event that the spring 107 does not itself effect the desired rocking of the shafts 51 and 52.

During the unfolding movement of the side wall panels 2, 2, the tongues 4 on the ends thereof follow outwardly, causing the ears 8 of the end wall panels 3 to enter and, in effect, slide through the slits 7 to thereby lock the end walls 3 of the receptacle in wall position and to limit the unfolding movement of the side walls or, in other words, to lock said side walls in their normal side wall position relative to the bottom panel.

During the unfolding movement of the side wall panels, the pointed pins 89 of the end wall folders 85 offer slight resistance to the unfolding movement of the side wall panels 2 and their tongues 4 and engage the tongue portions which slide outwardly over the outer faces of the ears 8. Although the pins 89 have been referred to as "pointed" it should be understood that the points are preferably small rounded ends which permit the tongues to slide freely under the pins. The pins are pointed so as to provide small end areas for engagement with the ears for the reason indicated. These pins 89 and the pressure pins may be screwed into the folders 85 so as to be inwardly or outwardly to the most advantageous operating position.

After the setting up of the box blank has been completed as explained, the mechanism carrying arms 22 and 30 are elevated to withdraw the unfolding arms 104 and the mandrel 19 from the interior of the box so as to free the box for discharge from the mechanism. Such withdrawal of the parts from the formed box is, of course, effected by the action of the cam 40 (Fig. 2) on the arm 38 and shaft 37 which carries the arm 36 that controls the up and down movement of the upper forming mechanism.

Stripping means may be provided for preventing the boxes from following the mandrel upwardly, but such means is not required. The mandrel 19 is the only element which has a close fitting relationship to the finished boxes but even this is not so tight as to cause the boxes to follow the mandrel upwardly. When the folders are retracted from the sides and ends of the boxes, the side and end walls thereof tend to unfold and do so to a slight extent owing to the normal resiliency of the box material. This slight unfolding is adequate to free the boxes from said mandrel and to prevent the boxes from clinging to the mandrel.

Incident to the upward or retracting movement of the upper forming mechanism, the boxes are forcibly ejected from their forming positions on the table plate 13 by means of a pair of ejector members 113, 113 (Figs. 2, 6 and 16) which also serve, in the event that a box tends to hang on the mandrel, to knock such box from the mandrel. These ejector members 113 are adjustably mounted through suitable clamping blocks 114 on a shaft 115 that is mounted in the ends of rock arms 116. The rock arms 116 are secured at their other ends to a shaft 117 which is rotatably supported in a pair of stationary bracket arms 118 which extend forwardly from a rear frame portion or cross member 119 which is carried by the upstanding bracket members 29.

The shaft 117 is rocked to effect ejecting movement of the members 113 from the position shown in Fig. 16 to the position shown in Fig. 6 by means of a spring and cam actuated rock arm 120. The rock arm 120 is secured to a rock shaft 121 which is journaled in a pair of bearing members 122, 122 carried by the frame member 119 (see also Fig. 3). At its outer end the shaft 121 is provided with an arm 123 having at its free end a roller 124 for engaging a rotary cam 125 carried by the cam shaft 42. A spring 126 stretched between a pin 127 projecting from a collar fastened to one end of the shaft 121 and an anchorage carried by the frame member 14 (Figs. 1 and 3) serves to urge the shaft 121 to rock in such a direction as to maintain the roller 124 in operative engagement with the cam 125. The cam 125 is so formed as to cooperate with the spring 126 to rock the shaft 121 and ejector actuating arm 120 in the required synchronized relationship to the movement of the other parts of the mechanism. Rocking movement of the arm 120 is imparted to the shaft 117 (Figs. 3 and 6) through the agency of a link 128 which connects the free end of the rock arm 120 with the free end of an arm 129 which arm 129 is secured to and extends rearwardly from the ejector carrying shaft 117.

The blank positioning gauges 18 are, of course, in the path of movement of the ejected boxes but the normal tendency for the bottom of the folded-up box to bulge downwardly together with the force of the ejecting fingers 113 serves to cause the box to readily free itself from said positioning gauges. It will be observed that the ejecting movement of the fingers 113 is yieldingly effected by the spring 126 and that retracting movement is effected by the action of the cam 125. The formed-up boxes are accordingly fed rearwardly through the machine, ultimately to pass between the frame members 29 and under the shaft 28 to the inclined discharge slide 130 by which the boxes are delivered to a collecting receptacle or to a conveyor for transmission to other points.

The described mechanism effects the various operations while holding the blank in a fixed position as distinguished from any prior mechanisms in which the folding operations are formed in connection with movement of the blank through forming dies, ultimately to be discharged in a plane above or below the plane in which the blanks are initially delivered.

The mechanism herein described operates on the blank while maintaining it in an elevated, fixed plane of operation in which the finished boxes are desirably subsequently propelled into filling and other mechanisms so that special equipment for feeding the boxes from a lower plane to an elevated plane is made unnecessary. However, to facilitate the feeding of the blanks into forming position and the discharge of the boxes from the forming position, the structure is mounted so that its forming table 12 is in an inclined position relative to the horizontal. The mechanism may, of course, be so mounted that its table plate 13 is horizontally disposed if preferred.

The described mechanism is initially free of mechanisms designed to impart exact degrees of movement to various elements while at the same time being so designed that the various folding movements are efficiently produced, generally through the agency of yieldable elements so that there is a minimum of danger of damaging the machine in the event that plugging or jamming occurs because of the improper positioning of a carton blank or for some other cause. This is, of course, a very important advantage in a mechanism of this type.

The machine is of relatively small size and embodies simple parts and mechanical movements so that it is well adapted to use by those who require only a relatively small number of receptacles to be set up from day to day. The mechanism is nevertheless also sturdy and serviceable so that it may be operated continuously from day to day in connection with large volume box-filling line of mechanism. Various other advantages of the invention will appear to those skilled in the art.

In the following claims reference is made in some instances to side and end wall panels and to tongues extending endwise from the ends of the side wall panels. The tongues may extend from the end wall panels if preferred. For the purpose of interpreting such claims, the panels from which the tongues project should be considered the "side" walls whether such walls are longer or shorter than the other walls which should correspondingly be considered the "end" walls.

Changes may be made in the described structure without departing from the spirit of the invention.

We claim:

1. Apparatus for forming a receptacle from a blank which is cut and creased to provide a rectangular bottom panel, pairs of side and end wall panels foldably connected to the sides and ends of said bottom panel, tongues foldably connected to and extended endwise from the ends of said panels, and cooperating slits and ears in said tongues and end wall panels for locking said side and end wall panels in set-up position, the apparatus comprising a table for supporting a receptacle blank, a mandrel mounted for movement toward and from said table and operative to clamp the bottom panel of the blank in predetermined position on said table, means for folding the tongues and end wall panels of the blank upwardly, the end wall panels being folded into a plane which is offset relative to the planes of the tongues, means for folding the side wall panels and the folded tongues upwardly and inwardly beyond the desired side wall position relative to the bottom panel, means for further folding said end wall panels and said tongues into face to face relationship in planes substantially corresponding to the planes of said tongues and end wall panels in the finished receptacle, said last-mentioned end wall and tongue folding means being provided with members operative to displace the locking ears of the blank for passage through the locking slits thereof, and means for effecting limited unfolding movement of said side wall panels and tongues to thereby cause said ears to be passed through said slits to thereby lock the walls of the box in set-up position.

2. Apparatus for forming a receptacle from a blank which embodies portions respectively constituting a rectangular bottom panel, pairs of side and end wall panels foldably connected to the sides and ends of said bottom panel, tongues foldably connected to and extended endwise from the ends of said side panels, and slits and ears in said tongues and end wall panels adapted to cooperate to lock said side and end wall panels in set-up position, the apparatus comprising a bed structure having a supporting frame and a table for supporting a receptacle blank, a mandrel mounted for movement toward and from said table and operative to clamp the bottom panel of the blank in predetermined position on said table, means carried by said bed structure for folding said end wall panels and tongues into upwardly extending relationship to the bottom panel and side wall panels respectively while said bottom panel is clamped to said table as aforesaid, means carried by said bed structure for folding the side wall panels of the blank upwardly and inwardly beyond their normal receptacle forming positions relative to the bottom panel, said tongues being thereby also folded inwardly beyond their normal receptacle forming position, means associated with said mandrel for effecting unfolding of said side wall panels and tongues to normal receptacle forming relationship to said bottom panel, and means whereby said ears are passed through said slits as an incident to said unfolding of said side wall panels.

3. Apparatus for forming a receptacle from a blank which embodies portions respectively constituting a rectangular bottom panel, pairs of side end wall panels foldably connected to the sides and ends of said bottom panel, tongues foldably connected to and extending endwise from the ends of one pair of oppositely disposed wall panels, the apparatus comprising a bed structure having a frame and table for supporting a receptacle blank, a mandrel mounted for movement toward and from said table and operative to clamp the bottom panel of the blank in predetermined position on said table, fingers associated with said mandrel and engageable with free marginal portions of said oppositely disposed wall panels adjacent their ends to clamp said wall panels to said table, folders mounted on said bed structure and movable relative to said table to fold the other pair of wall panels upwardly relative to said bottom panels and said tongues upwardly relative to said pair of oppositely disposed wall panels, means for moving said fingers to free said oppositely disposed wall panels, and folders mounted on said bed structure and movable relative to said table to fold said oppositely disposed pair of wall panels upwardly relative to said bottom panels, said tongues being thereby also incidentally folded into overlapping relationship to said other pair of wall panels.

4. Apparatus for forming a receptacle from a blank which embodies portions respectively constituting a rectangular bottom panel, pairs of side and end wall panels foldably connected to the sides and ends of said bottom panel, tongues foldably connected to and extending endwise from the ends of one pair of oppositely disposed wall panels, said tongues being of such length as to be adapted to extend into mutually overlapping relationship when the blank is formed into a receptacle, the apparatus comprising a bed structure having a frame and table for supporting a receptacle blank, a mandrel mounted for movement toward and from said table and operative to clamp the bottom panel of the blank in predetermined position on said table, fingers associated with said mandrel and engageable with free marginal portions of said oppositely disposed wall panels adjacent their ends to clamp said wall panels to said table, folders mounted on said bed structure and movable relative to said table to fold the other pair of wall panels upwardly relative to said bottom panels and said tongues upwardly relative to said pair of oppositely disposed wall panels, means for moving said fingers to free said oppositely disposed wall panels, and folders mounted on said bed structure and movable relative to said table to fold said oppositely disposed pair of wall panels upwardly relative to said bottom panels, said tongues being thereby also incidentally folded into overlapping relationship to said other pair of wall panels and to each other, said tongue folding means being such as to effect upward folding of the respective pairs of tongues to different angular relationships to the plane of the blank, whereby, when said tongue bearing pair of wall panels are folded upwardly as aforesaid, said tongues will freely pass each other into said mutually overlapping relationship.

5. Apparatus for forming a receptacle from a blank which embodies portions respectively constituting a rectangular bottom panel, pairs of side and end wall panels foldably connected to the sides and ends of said bottom panel, tongues foldably connected to and extending endwise from the ends of said side wall panels, the apparatus comprising a bed structure having a frame and table for supporting a receptacle blank, a mandrel carrier mounted for movement toward and from said table, a mandrel on said carrier and operative to clamp the bottom panel portion of the blank to said table when said carrier is moved toward the table, side wall holding fingers also mounted on said carrier for engaging free marginal portions of said side wall panels to clamp the same to said table, end wall panel and tongue folders mounted on said bed structure and operative to fold said end wall panel and tongue portions upwardly from the bottom and side wall panels respectively when said bottom and side wall panels are clamped to said table as aforesaid, an arm structure associated with said mandrel and movable toward and from said table independently of said mandrel when the latter is in blank holding position, means carried by said arm structure for actuating said end wall and tongue folders, means also carried by said arm structure for effecting disengagement of said side wall holding fingers from said side wall panels after said tongues are folded upwardly, and means for folding said side wall panels upwardly from said bottom panel.

6. Apparatus according to claim 5, wherein the mandrel carrier and arm structure are initially movable as a unit toward the table until the mandrel and side wall holding fingers are in blank clamping relationship to the table, and wherein said arm structure is movable independently of said carrier in continuation of said unitary movement, the end wall folder actuating means and the finger disengaging means being operative as an incident to said independent movement of said arm structure.

7. Apparatus according to claim 5, wherein the mandrel carrier and arm structure are initially movable as a unit toward the table until the mandrel and side wall holding fingers are in blank clamping relationship to the table, and wherein said arm structure is movable independently of said carrier in continuation of said unitary movement, the end wall folder actuating means and the finger disengaging means being operative as an incident to said independent movement of said arm structure, and wherein there is provided cam means for controlling movement of said arm structure and yieldable means for transmitting movement of said arm structure to said mandrel carrier to effect said unitary movement, said yieldable means serving to permit continuation of the movement of said arm structure after the mandrel and side wall holding fingers reach said blank clamping relationship to the table.

8. Apparatus for forming a receptacle from a blank which embodies portions respectively constituting a rectangular bottom panel, pairs of side and end wall panels foldably connected to the sides and ends of said bottom panel, tongues foldably connected to and extending endwise from the ends of said side wall panels, the apparatus comprising a bed structure having a frame and a normally stationary table for supporting a receptacle blank, a mandrel carrier mounted for movement toward and from said table, a mandrel on said carrier and operative to clamp the bottom panel portion of the blank to said table when said carrier is moved toward the table, side wall holding fingers also mounted on said carrier for engaging free marginal portions of said side wall panels to clamp the same to said table, end wall panel and tongue folders mounted on said bed structure and operative to fold said end wall panel and tongue portions upwardly from the bottom and side wall panels respectively when said bottom and side wall panels are clamped to said table as aforesaid, an arm structure associated with said mandrel and movable toward and from said table independently of said mandrel when the latter is in blank holding position, means carried by said arm structure for actuating said end wall and tongue folders, means also carried by said arm structure for effecting disengagement of said side wall holding fingers from said side wall panels after said tongues are folded upwardly, side wall panel folders mounted on said bed structure, and cam controlled means for actuating said side wall folders, said end and side wall folders and said tongue folders being normally located below the blank receiving surface of said table and movable upwardly therethrough to effect their respective folding operations, whereby placement of blanks in folding position on said table is facilitated.

9. Apparatus for forming a receptacle from a blank which embodies portions respectively constituting a rectangular bottom panel, pairs of side and end wall panels foldably connected to the sides and ends of said bottom panel, tongues foldably connected to and extended endwise from the ends of said side panels, and slits and ears in said tongues and end wall panels adapted to cooperate to lock said side and end wall panels in set-up position, the apparatus comprising a bed structure having a supporting frame and a table for supporting a receptacle blank, a mandrel carrier and a mandrel mounted for movement toward and from said table and operative to clamp the bottom panel of the blank in predetermined position on said table, fingers movably mounted on said mandrel carrier and engageable with said side wall panels to clamp the same to said table, means carried by said bed structure for folding said end wall panels and tongues into upwardly extending relationship to the bottom panel and side wall panels respectively while said bottom panel and said side wall panels are clamped to said table as aforesaid, means mounted on said mandrel carrier for moving said fingers to release said side wall panels, means carried by said bed structure for folding the side wall panels of the blank upwardly and inwardly beyond their normal receptacle forming positions relative to the bottom panel, said tongues being thereby also folded inwardly beyond their normal receptacle forming positions, means associated with said mandrel for effecting unfolding of said side wall panels and tongues to normal receptacle forming relationship to said bottom panel, and means whereby said ears are passed through said slits as an incident to said unfolding of said side wall panels.

10. Apparatus for forming a receptacle from a blank which embodies portions respectively constituting a rectangular bottom panel, pairs of side and end wall panels foldably connected to the sides and ends of said bottom panel, tongues foldably connected to and extended endwise from the ends of said side panels, and slits and ears in said tongues and end wall panels adapted to cooperate to lock said side and end wall panels in set-up position, the apparatus comprising a bed structure having a supporting frame and a table for supporting a receptacle blank, a mandrel carrier and a mandrel mounted for movement toward and from said table and operative to clamp the bottom panel of the blank in predetermined position on said table, fingers movably mounted on said mandrel carrier and engageable with said side wall panels to clamp the same to said table, means carried by said bed structure for folding said end wall panels and tongues into upwardly extending relationship to the bottom panel and side wall panels respectively, while said bottom panel and said side wall panels are clamped to said table as aforesaid, means mounted on said mandrel carrier for moving said fingers to release said side wall panels, means carried by said bed structure for folding the side wall panels of the blank upwardly and inwardly beyond their normal receptacle forming positions relative to the bottom panel, said tongues being thereby also folded inwardly beyond their normal receptacle forming positions, yieldingly actuated means engaging the inside faces of said side walls adjacent the ends thereof for effecting unfolding of said side walls to normal receptacle forming relationship to said bottom panel, and means whereby said ears are passed through said slits as an incident to said unfolding of said side wall panels 11. Apparatus for forming a receptacle from a blank which embodies portions respectively constituting a rectangular bottom panel, pairs of side and end wall panels foldably connected to the sides and ends of said bottom panel, tongues foldably connected to and extended endwise from the ends of said side panels, and slits and ears in said tongues and end wall panels adapted to cooperate to lock said side and end wall panels in set-up position, the apparatus comprising a bed structure having a supporting frame and a table for supporting a receptacle blank, a mandrel carrier and mandrel mounted for movement toward and from said table and operative to clamp the bottom panel of the blank in predetermined position on said table, means carried by said bed structure for folding said end wall panels and tongues into upwardly extending relationship to the bottom panel and side wall panels respectively, while said bottom panel is clamped to said table as aforesaid, means carried by said bed structure for folding the side wall panels of the blank upwardly and inwardly beyond their normal receptacle forming positions relative to the bottom panel, said tongues being thereby also folded inwardly beyond their normal receptacle forming positions, side wall unfolding arms pivoted on said mandrel carrier and engageable with the inside faces of the respective side walls, spring means normally urging said arms to rock outwardly in opposition to the folding movement of said side wall panels and folders but yielding to the pressure of the latter, whereby, when said side wall folders are retracted, said unfolding arms are yieldingly urged to follow said folders and to thereby effect unfolding of said side wall panels and tongues to normal receptacle forming position, and means whereby said ears are passed through said slits as an incident to said unfolding of said side wall panels.

12. Apparatus for forming a receptacle from a blank which embodies portions respectively constituting a rectangular bottom panel, pairs of side and end wall panels foldably connected to the sides and ends of said bottom panel, tongues foldably connected to and extended endwise from the ends of said side panels, and slits and ears in said tongues and end wall panels adapted to cooperate to lock said side and end wall panels in set-up position, the apparatus comprising a bed structure having a supporting frame and a table for supporting a receptacle blank, a mandrel carrier and mandrel mounted for movement toward and from said table and operative to clamp the bottom panel of the blank in predetermined position on said table, means carried by said bed structure for folding said end wall panels and tongues into upwardly extending relationship to the bottom panel and side wall panels respectively, while said bottom panel is clamped to said table as aforesaid, means carried by said bed srtucture for folding the side wall panels of the blank upwardly and inwardly beyond their normal receptacle forming positions relative to the bottom panel, said tongues being thereby also folded inwardly beyond their normal receptacle forming positions, side wall unfolding arms pivoted on said mandrel carrier and engageable with the inside faces of the respective side walls, spring means normally urging said arms to rock outwardly in opposition to the folding movement of said side wall panels and folders but yielding to the pressure of the latter, stop means for limiting the movement of said unfolding arms and said side wall folders in side wall folding direction, said unfolding arms being yieldingly urged to follow retracting movement of said side wall folders and to thereby effect unfolding of said side wall panels and tongues to normal receptacle forming position, and means whereby said ears are passed through said slits as an incident to said unfolding of said side wall panels.

13. Apparatus for forming a receptacle from a blank which embodies portions respectively constituting a rectangular bottom panel, pairs of side and end wall panels foldably connected to the sides and ends of said bottom panel, tongues foldably connected to and extended endwise from the ends of said side panels, and slits and ears in said tongues and end wall panels adapted to cooperate to lock said side and end wall panels in set-up position, the apparatus comprising a bed structure having a supporting frame and a table for supporting a receptacle blank, a mandrel carrier and a mandrel mounted for movement toward and from said table and operative to clamp the bottom panel of the blank in predetermined position on said table, fingers movably mounted on said mandrel carrier and engageable with said side wall panels to clamp the same to said table, means carried by said bed structure for folding said end wall panels and tongues into upwardly extending relationship to the bottom panel and side wall panels respectively while said bottom panel and said side wall panels are clamped to said table as aforesaid, means mounted on said mandrel carrier for moving said fingers to release said side wall panels, means carried by said bed structure for folding the side wall panels of the blank upwardly and inwardly beyond their normal receptacle forming positions relative to the bottom panel, said tongues being thereby also folded inwardly beyond their normal receptacle forming positions, side wall unfolding arms pivoted on said mandrel carrier and engageable with the inside faces of the respective side wall panels, spring means normally urging said arms to rock outwardly in opposition to the folding movement of said side wall panels and folders but yielding to the pressure of the latter whereby, when said side wall folders are retracted, said unfolding arms are yieldingly urged to follow said folders and to thereby effect unfolding of said side wall panels and tongues to normal receptacle forming relationship to said bottom panel, means for limiting the extent to which said unfolding arms may follow said folders to that required for returning said side wall panels to normal wall position relative to said bottom panel, and means whereby said ears are passed through said slits as an incident to said unfolding of said side wall panels.

RALPH R. RICHARDSON.
DON W. COY.

REFERENCES CITED

The following references are of record in the file of this patent:

UNITED STATES PATENTS

| Number | Name | Date |
| --- | --- | --- |
| 1,163,863 | Schlegel | Dec. 14, 1915 |
| 1,409,474 | Shafer | Mar. 14, 1922 |
| 2,017,583 | Burrow | Oct. 15, 1935 |

FOREIGN PATENTS

| Number | Country | Date |
| --- | --- | --- |
| 615,495 | Great Britain | Jan. 6, 1949 |